(12) United States Patent
Berta et al.

(10) Patent No.: US 7,779,872 B2
(45) Date of Patent: Aug. 24, 2010

(54) SERVICE UNIT FOR REPLENISHING SERVICE FLUIDS

(75) Inventors: Christian Berta, Calw (DE); Helmut Gocht, Moensheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1142 days.

(21) Appl. No.: 11/430,032

(22) Filed: May 9, 2006

(65) Prior Publication Data

US 2006/0283439 A1 Dec. 21, 2006

(30) Foreign Application Priority Data

May 10, 2005 (DE) .................. 10 2005 021 457

(51) Int. Cl.
*B65B 1/04* (2006.01)
(52) U.S. Cl. ...................... 141/87; 141/88; 220/573
(58) Field of Classification Search ............ 141/86–88, 141/97, 363, 365, 369–371, 311 A; 220/86.2, 220/573
See application file for complete search history.

(56) References Cited

U.S. PATENT DOCUMENTS

| 1,699,889 | A | | 1/1929 | Harlow et al. | |
|---|---|---|---|---|---|
| 4,830,067 | A | * | 5/1989 | Foutch | 141/86 |
| 5,718,471 | A | * | 2/1998 | McHorse | 296/97.22 |
| 5,785,099 | A | * | 7/1998 | Kashani | 141/86 |
| 5,833,528 | A | | 11/1998 | Baum et al. | |
| 5,992,481 | A | | 11/1999 | Smith | |
| 6,708,736 | B2 | | 3/2004 | Bender | |

FOREIGN PATENT DOCUMENTS

| DE | 10 96 787 B | 1/1961 |
|---|---|---|
| DE | 32 00 311 A1 | 7/1983 |
| DE | 198 05 715 A1 | 8/1998 |
| DE | 103 36 847 A1 | 3/2005 |
| DE | 103 59 767 B4 | 1/2006 |
| JP | 59144123 A | 9/1984 |
| JP | 2542674 B2 | 7/1997 |

OTHER PUBLICATIONS

German Office Action dated Mar. 13, 2006, including an English Translation of pertinent portion (Three (3) pages).
European Search Report dated Sep. 8, 2006 including an English translation of the pertinent portions (Six (6) pages).
Machine Translation of Japanese Official Action dated Apr. 24, 2009—Japanese Application No. 2006-129343.
German Office Action dated Mar. 9, 2006.

* cited by examiner

*Primary Examiner*—Gregory L Huson
*Assistant Examiner*—Jason K Niesz
(74) *Attorney, Agent, or Firm*—RatnerPrestia

(57) ABSTRACT

A service unit for use in replenishing and/or maintaining service fluids in a vehicle has a unit, such as a driving engine, with at least one service element, such as fill nozzles, and a collecting pan that at least partially encompasses the service element. To ensure the convenient replenishment or maintenance of service fluids, a protective drip cover is attached to the collecting pan. The protective drip cover can be shifted from a non-deployed position to a protective position, in which it projects at least partially beyond the collecting pan.

24 Claims, 4 Drawing Sheets

150 # SERVICE UNIT FOR REPLENISHING SERVICE FLUIDS

This application claims the priority of German application 10 2005 021 457.6, filed May 10, 2005, the disclosure of which is expressly incorporated by reference herein.

Cross-reference is hereby made to commonly assigned, related German application DE 10 2005 021 456.8, filed May 10, 2005.

BACKGROUND AND SUMMARY OF THE INVENTION

This invention relates to a service unit for replenishing and/or maintaining service fluids in a vehicle with a driving engine, including at least one service element, a collecting pan that at least partially encompasses the service element, and a protective drip cover attached to the collecting pan.

A service unit for use in replenishing service fluids or for maintenance/inspection performed in a vehicle having an engine as the driving unit is disclosed by German document DE 103 59 767. This service unit is preferably arranged inside the vehicle, for example in the trunk. As a service element, the element has a filling nozzle for replenishing service fluids, for example coolant for the driving engine, and a collecting pan that at least partially encompasses the filling nozzle and serves to collect any fluid that may be spilled during the replenishment of service fluids, preferably draining it off via an outlet.

An object of this invention is to propose a service unit of the type referred to above by which the replenishment or maintenance of service fluids can be simplified.

This object is attained by way of a service unit that has a protective drip cover which can be shifted from a non-deployed position to a protective position, in which it projects at least partially beyond the collecting pan. Further features of the invention are also claimed.

Primary advantages achieved by the invention are that any fluid that is spilled or escapes during a replenishment of service fluids performed via the service unit can be better collected and drawn off into a collecting pan. Furthermore, any steam that escapes from the service element and condenses on the collecting pan or on the protective drip cover can be drained off. If, for example, a dip stick, such as an oil dipstick, is arranged in the service unit, any fluid that drips off the dipstick when the filling level is being checked can be collected on the protective drip cover. The areas of the vehicle that surround the collecting pan or service unit are thus protected against becoming soiled in a simple manner. The service unit of the invention can be used in a motor vehicle and located in the interior of the vehicle or in its trunk. Thus a soiling of the interior trim sections of the motor vehicle that encompass the service unit can be prevented in most cases.

According to a further feature of the invention, when unfolded into its protective position, the protective drip cover can cover a large surface area.

The protective drip cover can be securely attached via the mounting section to the collecting pan, so that only the folding section of the protective drip cover can be shifted to its protective position via unfolding.

A simple method for producing the protective drip cover is also disclosed.

The protective drip cover with the folding section can be realized in a particularly simple manner.

A simple mounting of the protective drip cover on the collecting pan is produced by constructing the mounting device as a rear grip element such that the protective drip cover can be hooked, clipped, or snapped onto the collecting pan. Furthermore, the rear grip element also serves to seal the through hole in the collecting pan.

The mounting device can be attached to the collecting pan in a particularly simple manner, especially if it is designed as a rear grip element.

Improved protection can be achieved with the protective drip cover, because spilled or escaped fluid or rapidly condensing steam cannot flow off the sides of the protective drip cover due to the side panels that are provided.

The protective drip cover can be advantageously unfolded, and can then be folded back together for a return to its non-deployed position. The fold lines can be implemented via weakened sections in the material of the protective drip cover, for example, so that film hinges are formed.

The mounting section can extend over a broad area of the inner rim of the collecting pan, and may also lie adjacent to the inner rim forming a seal.

With a corresponding embodiment of the collecting pan, the mounting section is advantageously designed such that the collecting pan possesses an oviform, angular or similar rim shape, along which the base and side arms of the mounting section partially extend.

An embodiment of the protective drip cover in which the protective drip cover is pan-shaped when deployed in its protective position, but which can be easily folded together to its non-deployed position, can further be realized.

For securely mounting the protective drip cover along the inner rim of the collecting pan, multiple rear grip elements are provided as mounting elements. The seal between the collecting pan and the protective drip cover is further optimized by this arrangement.

The service unit or the collecting pan can be covered with a cap.

Greater ease of operation is achieved when the protective drip cover can be automatically unfolded from its non-deployed position to its protective position.

A particularly favorable arrangement—if necessary even in a visually exposed location—within the vehicle can additionally be achieved.

The invention will be described in greater detail below based on embodiments shown in the drawings.

DETAILED DESCRIPTION OF THE INVENTION

Figure 1:
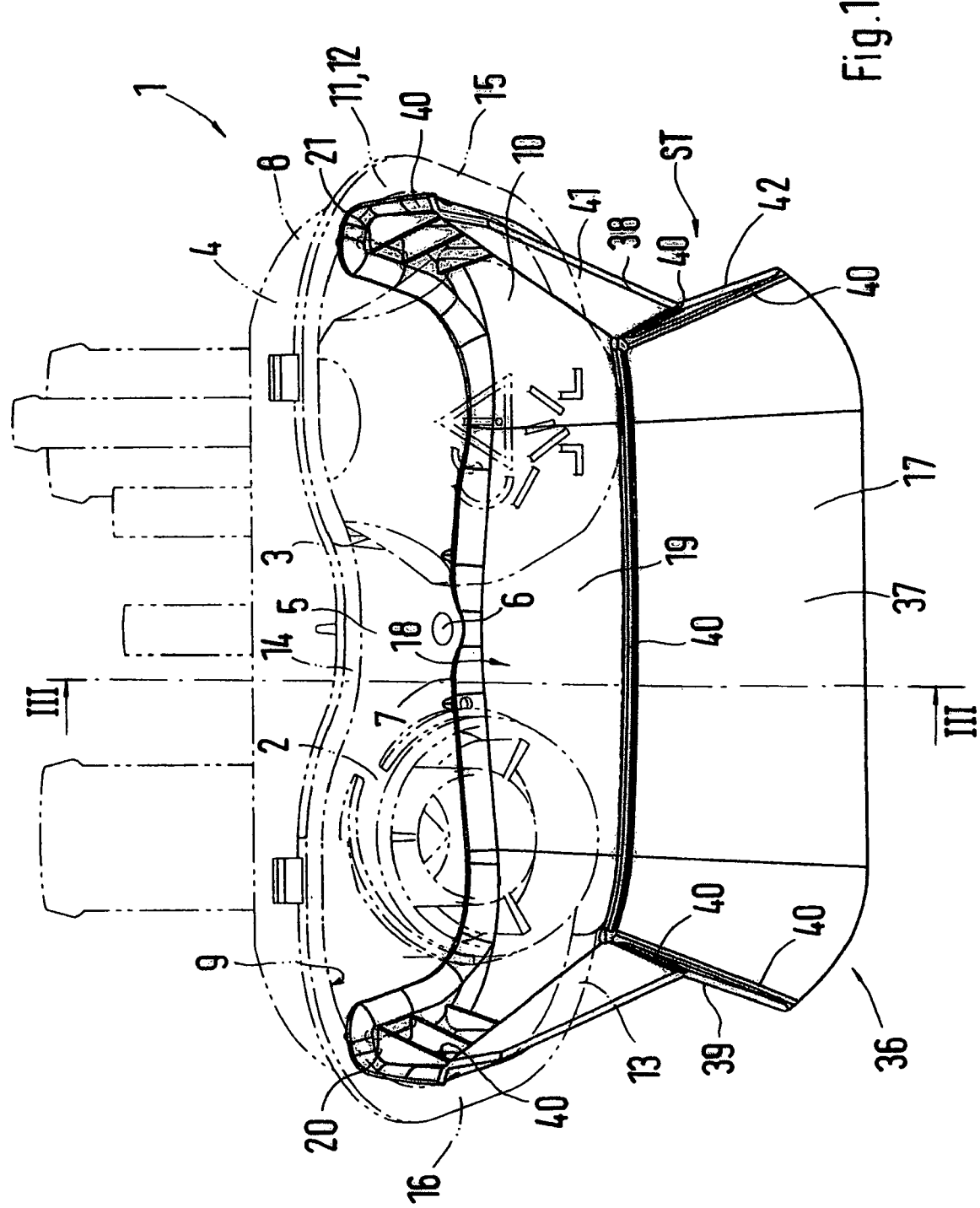
FIG. 1 is a top view of a service unit with a protective drip cover.

FIG. 1 shows a service unit 1 for replenishing service fluids and/or for maintenance and/or inspection of at least one service fluid for at least one unit, especially a driving engine (not shown here) for a motor vehicle, which is not shown in greater detail here. Service fluids of this type can be fluids such as fuel, coolant, lubricant, hydraulic oil, power-steering fluid, refrigerant for an air-conditioning system, and the like. Accordingly, the service unit 1 comprises at least one service element for performing the replenishment, maintenance, or checking of the service fluids of the unit. This service element can be designed as a dipstick, such as an oil dipstick, a test opening, a level glass, which may be removable, a coupler, such as a valve (if necessary a pressure release or fill valve), fill nozzles 2, or similar elements. In any case, via this service element a service fluid for the unit may escape and/or be refilled and/or be checked. In the embodiment of the service unit 1 shown, two service elements are provided, which are realized as fill nozzles 2 and 3, of which especially fill nozzle 2 is used to fill lubricant into the driving engine, and fill nozzle 3 is used to fill the cooling circuit for the driving engine. Naturally other service elements can also be arranged to the service unit 1.

The at least one fill nozzle 2 or 3 or the service element is at least partially encompassed by a collecting pan 4, which comprises a pan base 5 that can be equipped with a drain hole 6, which can be located in the pan base 5 itself, or in a transition area 7 between the pan base 5 and a pan wall 8, or in the pan wall 8 itself. The perimeter pan wall 8, oriented basically upright, the inner rim shape 9 of which is designed to be oviform, circular, or rectangular, for example, if desired with rounded corners, or in some similar manner, extends from the pan base 5. Preferably, however, the inner span of the pan wall 8 of the collecting pan 4 is such that the pan wall 8 lies at a distance to the fill nozzles 2, 3 or the sealing caps 10 placed upon them. Of course the fill nozzle 2 can also be provided with a sealing cap 10. The free wall end 11 of the pan wall 8 forms a perimeter pan rim 12, which comprises a lower rim section 13, an upper rim section 14 and two side rim sections 15 and 16.

Figure 3:
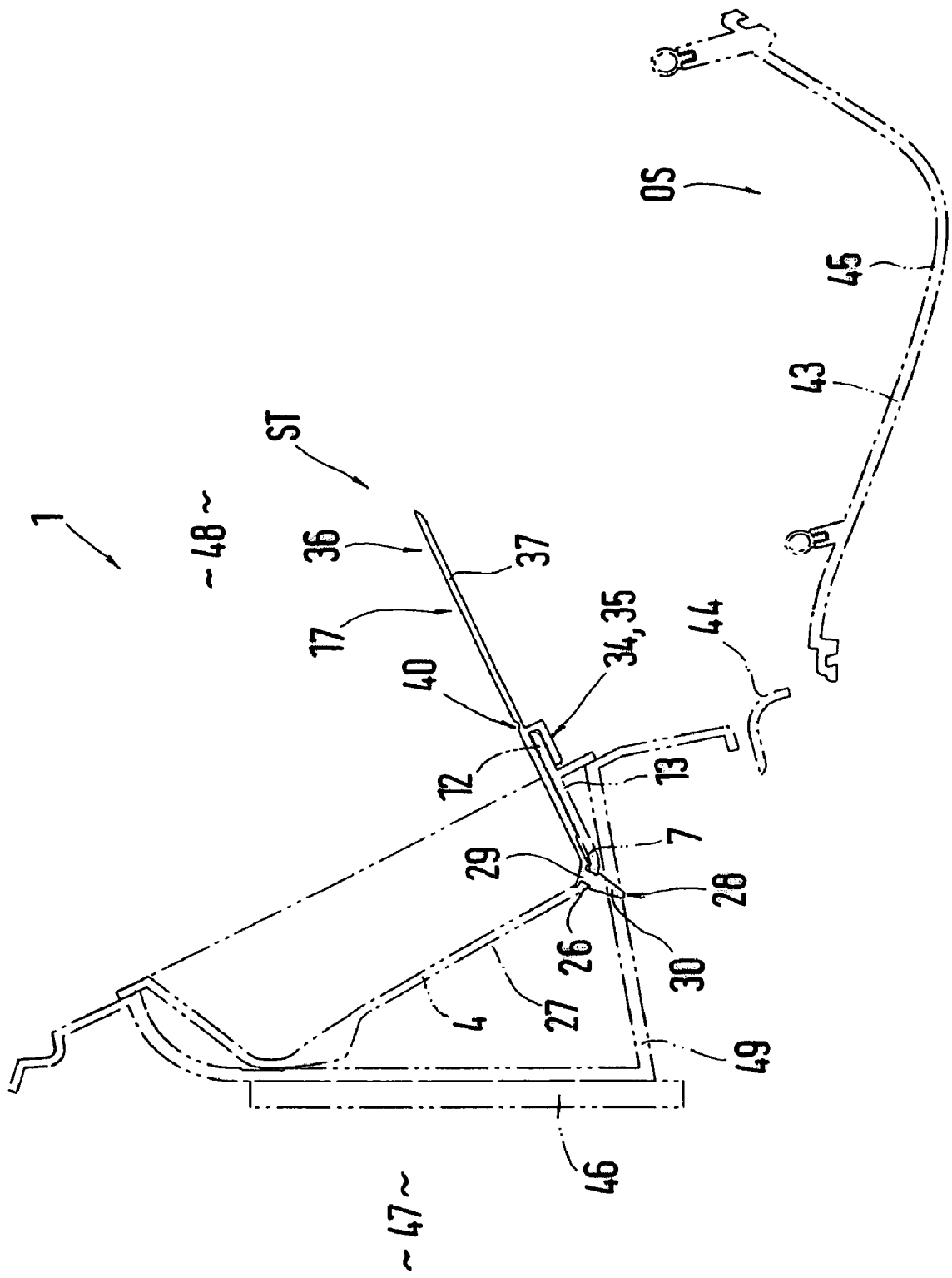
FIG. 3 shows the service unit with the protective drip cover in its protective position in a cross-section along line III-III of FIG. 1.
Figure 4:
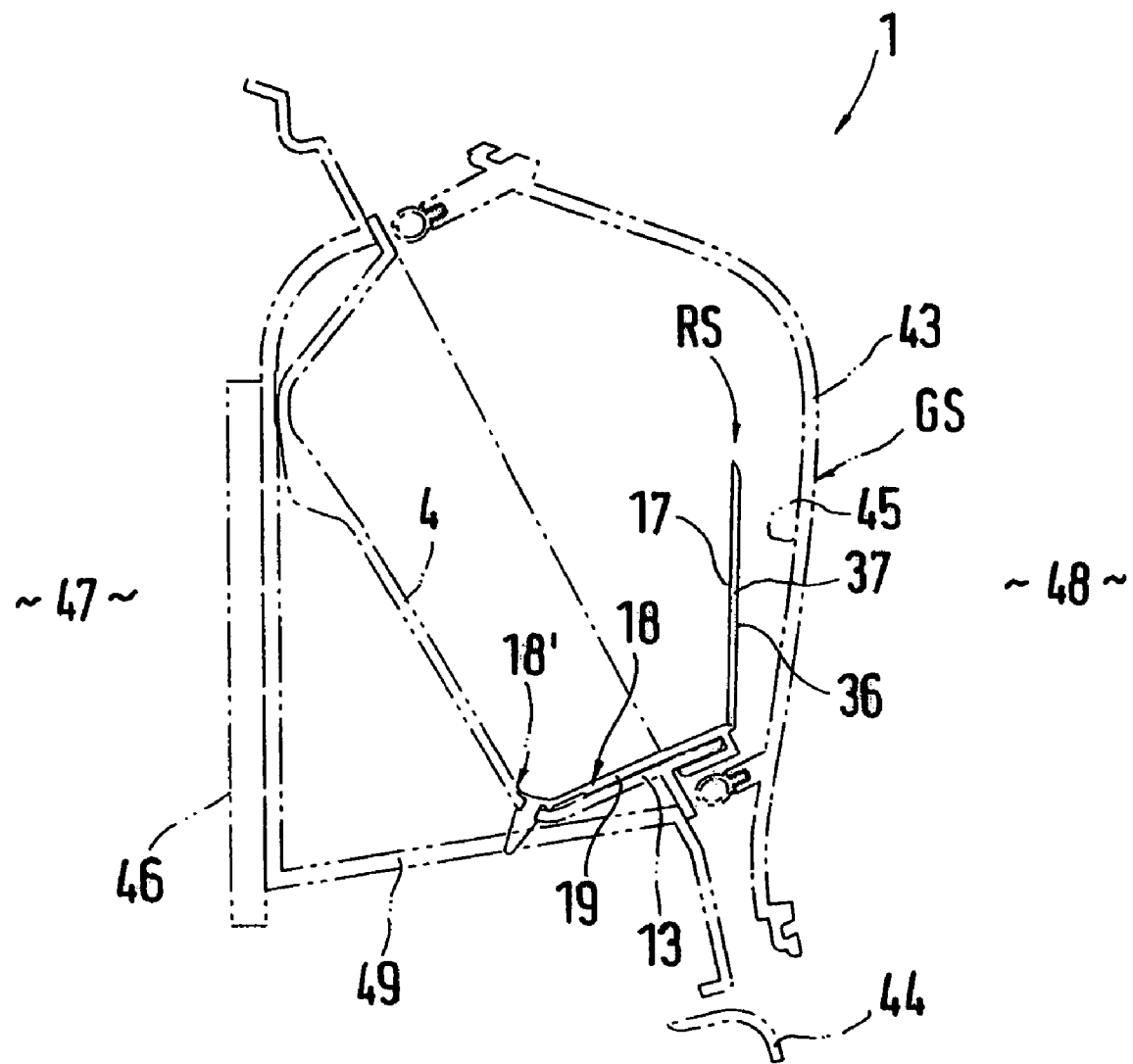
FIG. 4 is a cross-section of the service unit with the protective drip cover in its non-deployed position, with a cap covering the service unit.

At least one protective drip cover 17 is arranged to the collecting pan 4, which—as especially FIG. 4 shows—can lie inside the collecting pan 4 or inside the service unit 1 when in a non-deployed position RS and—as can be seen in FIGS. 1 and 3—can be shifted to a protective position ST in which it is unfolded and projects beyond the pan rim 12. In the opened or unfolded protective position ST, the protective drip cover 17 forms an extension of the pan wall 8, so that over an enlarged protection area, fluid that is spilled during the replenishment of service fluids via the service element, or fluid that escapes from the service element, or steam that escapes and rapidly condenses during maintenance or checking operations via the service element can be collected. To allow the protective drip cover 17 to be shifted from its non-deployed position RS to its protective position ST, it can be shifted—as mentioned above—from the folded, non-deployed position RS to the unfolded protective position ST. As follows especially from FIG. 1, the protective drip cover 17 is arranged to the lower rim section 13 of the pan rim 12 and is designed to conform with the inner rim shape 9 of the pan wall 8, and in particular lies against the pan wall 8 as a seal. Inside the collecting pan 4 is a mounting section 18 for the protective drip cover 17. In the preferred embodiment, this mounting section 18 is designed to be basically U-shaped, and thus has a base 19 that is arranged to the lower rim section 13; it further comprises side arms 20 and 21, which extend from the base 19, at least partially along the side rim sections 15 and 16 on the inside. The mounting section 18 can extend up to the pan base 5 and especially up to the transition area 7, and it may lie adjacent to the pan base 5 or the pan wall 8, forming a seal. To create an optimized seal, the mounting section 18 can be equipped with an area 18' that tapers in the direction of its unattached end, which thus forms a sealing lip, as can be seen in FIG. 4.

Figure 2:
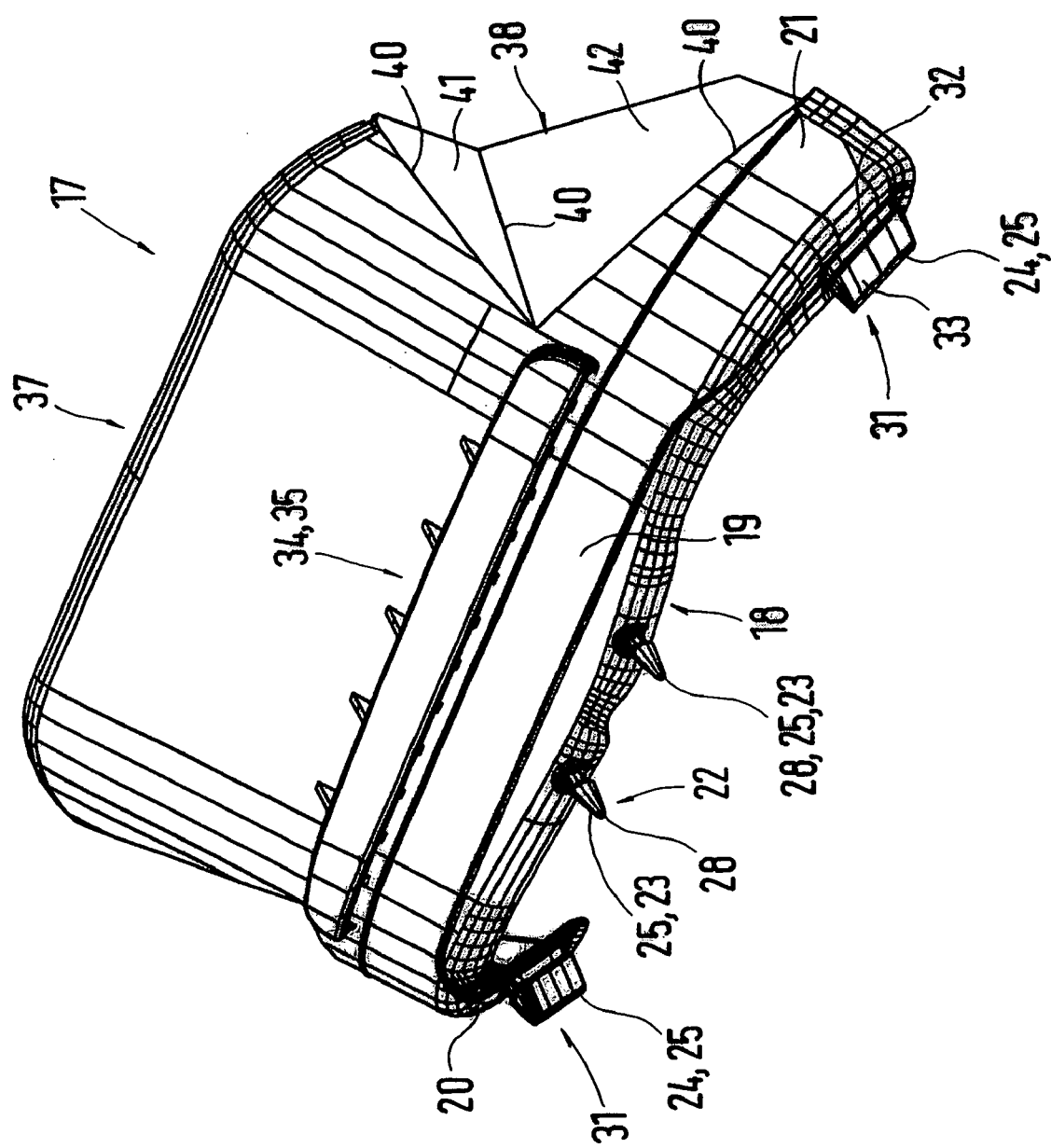
FIG. 2 is a perspective view of the protective drip cover.

The mounting section 18 comprises a fastening element 22 for fastening the protective drip cover 17 to the collecting pan 4, as is shown in FIGS. 2 and 3.

The fastening element 22 comprises one or more fastening elements 23, 24, which are designed as rear grip elements 25, each of which operates in conjunction with a through hole 26 correspondingly formed in the collecting pan 4 so that it extends through this through hole 26 and becomes engaged behind the outside 27 of the collecting pan 4. The mounting element or elements 23 are designed as so-called mushroom cams 28, wherein the base 29 extends through the through hole 26 and the mushroom cap 30 lies against the exterior side 27 forming a seal. The mounting elements 24 are designed as longitudinal fixed members 31, each of which comprises a base 32 that, like the base 29 of the mushroom cam 28, extends through a corresponding through hole in the collecting pan. Attached to the fixed member base 32 is a fixed member cap 33, which functions in a similar manner to the mushroom cap 30 and engages behind the exterior side 27 of the collecting pan 4 forming a seal. Additionally, the fastening element 22 may also comprise a snap-on section 34, which is designed as a pocket 35 that can be snapped onto the pan rim 12, as is illustrated especially in FIG. 3. With the at least one rear grip element 25 and/or the snap-on section 34, the protective drip cover 17 can be clipped, hooked, or snapped onto the collecting pan 4 in a simple method and manner, and thereby fastened to it. To ensure a secure mounting of the protective drip cover 17 on the collecting pan 4, the rear grip elements 25 of the fastening element 22 are arranged, spaced from one another, on the base 19 and the side arms 20 and 21 of the mounting section 18. It is especially provided that the mushroom cams 28 are arranged to the base 19, and the fixed members 31 are arranged to the side arms 20 and 21.

Attached to the mounting section 18 is a folding section 36 of the protective drip cover 17. In the protective position ST, the folding section 36 extends over the pan wall 18, thus forming a tray-like or funnel-like collecting element for spilled or escaped service fluid. For the embodiment in which this takes on a tray shape, the folding section 36 comprises a base 37 and side panels 38 and 39. To unfold the protective drip cover 17 from its non-deployed position RS into its protective position ST, the folding section 36 is connected to the mounting section 18 via at least one fold line 40. In the preferred embodiment the fold line is formed by a weakening of the material or via a cut, so that a film hinge is formed at the fold line 40. Thereby, the folding section 36 can be folded up beginning from the protective position ST and proceeding in the direction of the collecting pan 4, as is clearly shown in FIG. 4. In the embodiment shown, the folding section 36 is connected to the mounting section via multiple fold lines 40, i.e. such that one fold line is provided between the base 37 and the mounting section 18, as well as such that one fold line 40 is provided between each of the side panels 38 and 39 and the mounting section 18 each. Thus in the embodiment shown, one fold line 40 lies between the base 37 and the base 19, one fold line 40 lies between the side panel 38 and the arm 21, and one additional fold line 40 lies between the side panel 39 and the arm 20 of the mounting section 18. Furthermore, to fold the assembly together to save space, the folding section 36 can be folded over on itself, for which purpose additional fold lines 40 are provided between the side panels 38 and 39 and the base 37. Additionally, the side panels 38 and 39 may be foldable, so that each side panel 38 and 39 comprises at least two panel segments 41 and 42, which are connected to one another via another fold line 40. Thus the panel segments 41 and 42, separated from one another via the fold lines 40, form an approximately triangular shape, as is illustrated especially in FIG. 2 for the side panel 38. Because the folding section 36 and the mounting section 18, and the folding section 36 itself, are connected to one another via the fold lines 40, the protective drip cover 17 can be deployed as a single piece in a particularly simple manner, wherein it is especially provided to produce the protective drip cover 17 from a flexible material. For this purpose especially an elastomer, preferably a thermoplastic elastomer (TPE) is used, which has, for example, a hardness of 50+/−5 Shore A. A thermoplastic elastomer of this type is available, for example, under the trade name SANTOPRENE®.

In FIGS. 1 and 2, the protective drip cover 17 is shown in its manufactured form, i.e. the protective drip cover is manufactured unfolded. If the protective drip cover 17 is then folded together to its non-deployed position RS—as is shown in FIG. 4—due to the use of the flexible material it is pre-stretched in the direction of its protective position ST, so that the protective drip cover 17 can unfold automatically. The automatic unfolding of the protective drip cover 17 is especially advantageous if the service unit 17 is equipped with a cap 43 that seals the collecting pan 4, and can be removed from and replaced on the collecting pan 4. Preferably the cap 43 is mounted parallel to the lower rim section 13 and on a pivoting axis (not shown here) below this rim segment 13, so that it can be pivoted or folded from its closed position GS—shown in FIG. 4—to the open position OS—shown in FIG. 3. In the open position OS, the folding section 36 is then released so that it can unfold automatically to the protective position ST, and when the cap is closed, in other words when it is moved from the opened position OS to the closed position GS, the folding section is pressed into the non-deployed position RS by the cap 43, and thereby is folded in the direction of the collecting pan 4 on the one hand, and on the other hand the side panels 38 and 39 are folded down on themselves.

The cap 43 can be correspondingly hinged to pivot on an adjacent interior lining section 44. It is also conceivable, that the cap 43 can simply be removed from and replaced onto the collecting pan 4, in other words, that it does not have a fixed attachment. With the corresponding pivoting of the cap 43, and especially with its pivoting on the collecting pan 4, it would be conceivable for the protective drip cover 17 to be alternatively fastened to the inside of the cap 45, so that the folding section 36 could be unfolded in the direction of the lower rim segment 13.

As FIGS. 3 and 4 show, the service unit 1 is arranged to a chassis wall 46, which separates a drive unit space, especially the engine compartment 47 for the driving engine, from an interior space of the vehicle 48, especially the trunk. The chassis wall 46 can be essentially upright, and the service unit 1 can be arranged to the interior space of the vehicle 48. The service unit 1 is mounted on the chassis wall 46 via an installation frame 49. Thereby, the service unit or the collecting pan 4 is aligned on the installation frame 49 in an upright or tilted position—relative to the pan base 4. The rim segment 13 thus forms the lower section of the pan rim 12.

According to an embodiment not shown here, it would be conceivable for the service unit 1 to be oriented approximately horizontally, in other words for the pan base 5 to extend approximately horizontally. Preferably for this embodiment, the protective drip cover 17 could be designed to be funnel-shaped in its protective position ST. To accomplish this, the pan wall 8 could be equipped with two protective drip covers 17 that would extend around the perimeter of the pan wall 8 in the protective position ST.

As is also shown in FIG. 4, in the non-deployed position the folding section 36 of the protective drip cover 17 lies within the space of the service unit 1 that is delimited by the collecting pan and the cover 43. Depending upon the embodiment of the cap 43, the folding section 36 can be folded at least partially, up into the collecting pan 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A service unit for replenishing and/or maintaining service fluids in a vehicle with a unit, comprising:
    at least one service element,
    a collecting pan that at least partially encompasses the service element, and a protective drip cover attached to the collecting pan,
    wherein the protective drip cover can be shifted from a non-deployed position to a protective position, in which it projects at least partially beyond the collecting pan,
    wherein the protective drip cover is equipped with a mounting section for fastening it to the collecting pan and a folding section, which folding section can be shifted from the non-deployed position to the protective position,
    wherein the mounting section comprises a fastening element for mounting the protective drip cover on the collecting pan.

2. The service unit according to claim 1, wherein the protective drip cover can be shifted from the non-deployed position to the protective position by an at least partial unfolding.

3. The service unit according to claim 1, wherein the mounting section and the folding section are designed to form a single piece.

4. The service unit according to claim 1, wherein the protective drip cover is made of a flexible material.

5. The service unit according to claim 1, wherein the fastening element comprises at least one rear grip element, which extends through the collecting pan in a through hole.

6. The service unit according to claim 1, wherein the fastening element is designed to form a single piece with the protective drip cover.

7. The service unit according to claim 1, wherein the protective drip cover comprises a base and side panels.

8. The service unit according to claim 1, wherein the folding section is attached to the mounting section via a fold line.

9. The service unit according to claim 7, wherein each side panel is connected to the base via a fold line wherein when the collecting pan is oriented approximately upright in a vehicle and the protective drip cover is oriented in the protective position, the protective drip cover is configured to channel fluid into the collecting pan.

10. The service unit according to claim 7, wherein each side panel comprises two panel segments, which are connected to one another via a fold line.

11. The service unit according to claim 7, wherein each side panel is connected via a fold line to the base and to the mounting section.

12. The service unit according to claim 1, wherein the mounting section is designed to conform to the shape of an inner rim of the collecting pan.

13. The service unit according to claim 1, wherein the mounting section comprises a base and two side arms extending from it.

14. The service unit according to claim 13, wherein a base of the folding section is connected to the base of the mounting section and to one side panel each of the folding section with a respective arm of the base of the mounting section.

15. The service unit according to claim 13, wherein a fastening element is provided for mounting the protective drip cover on the collecting pan, and wherein the fastening element comprises multiple rear grip elements, at least one of which is arranged on the base, and one of which is arranged on each of the arms of the mounting section.

16. The service unit according to claim 1, wherein a removable cap seals the collecting pan.

17. The service unit according to claim 16, wherein, when the cap is removed, the protective drip cover can be automatically shifted from the nondeployed position to the protective position by unfolding.

18. The service unit according to claim 1, wherein the collecting pan can be oriented approximately upright in the vehicle, and wherein the protective drip cover is arranged at a lower rim segment of the collecting pan.

19. The service unit according to claim 1, wherein the unit is a driving engine.

20. The service unit according to claim 1, wherein the at least one service element is a plurality of fill nozzles.

21. The service unit according claim 7, wherein the folding section of the protective drip cover includes said base and side panels.

22. The service unit according to claim 1, wherein when the collecting pan is oriented approximately upright in a vehicle and the protective drip cover is oriented in the protective position, the protective drip cover is configured to channel fluid into the collecting pan.

23. A service unit for replenishing and/or maintaining service fluids in a vehicle with a unit, comprising:
    at least one service element,
    a collecting pan that at least partially encompasses the service element, and a protective drip cover attached to the collecting pan,
    wherein the protective drip cover can be shifted from a non-deployed position to a protective position, in which it projects at least partially beyond the collecting pan,
    wherein the protective drip cover is equipped with a mounting section for fastening it to the collecting pan and a folding section, which folding section can be shifted from the non-deployed position to the protective position,
    wherein the protective drip cover comprises a base and side panels wherein when the collecting pan is oriented approximately upright in a vehicle and the protective drip cover is oriented in the protective position, the protective drip cover is configured to channel fluid into the collecting pan.

24. A service unit for replenishing and/or maintaining service fluids in a vehicle with a unit, comprising:
    at least one service element,
    a collecting pan that at least partially encompasses the service element, and a protective drip cover attached to the collecting pan,
    wherein the protective drip cover can be shifted from a non-deployed position to a protective position, in which it projects at least partially beyond the collecting pan,
    wherein the protective drip cover is equipped with a mounting section for fastening it to the collecting pan and a folding section, which folding section can be shifted from the non-deployed position to the protective position,
    wherein the folding section is attached to the mounting section via a fold line.

* * * * *